United States Patent
Salas et al.

(10) Patent No.: US 11,470,868 B2
(45) Date of Patent: Oct. 18, 2022

(54) BIOTECHNOLOGICAL COMPOSITION AND ITS APPLICATION AT A STICK WATER EVAPORATION PLANT DURING THE FISH MEAL AND OIL MANUFACTURING PROCESS, AIMED TO AVOID INCREASE OF NITROGEN VOLATILE COMPOUNDS AND TO REDUCE THE VISCOSITY OF STICK WATER CONCENTRATE

(71) Applicant: Héctor Rodrigo Latorre Salas, Santiago (CL)

(72) Inventors: Héctor Rodrigo Latorre Salas, Santiago (CL); Claudio Andrés Bernal Opazo, Santiago (CL); Edwin Michael Garcia Dünner, Santiago (CL)

(73) Assignee: Héctor Rodrigo Latorre Salas, Santiago (CL)

( * ) Notice: Subject to any disclaimer, the term of this patent is extended or adjusted under 35 U.S.C. 154(b) by 279 days.

(21) Appl. No.: 16/678,331

(22) Filed: Nov. 8, 2019

(65) Prior Publication Data
US 2021/0137142 A1 May 13, 2021

(51) Int. Cl.
*A23L 17/00* (2016.01)
*A23L 29/00* (2016.01)

(52) U.S. Cl.
CPC .............. *A23L 17/65* (2016.08); *A23L 29/015* (2016.08); *A23L 29/035* (2016.08); *A23L 29/06* (2016.08); *A23V 2002/00* (2013.01)

(58) Field of Classification Search
CPC ........ A23L 17/65; A23L 29/06; A23L 29/035; A23L 29/015; A23V 2002/00

USPC ........................................................ 426/643
See application file for complete search history.

(56) References Cited

U.S. PATENT DOCUMENTS

| | | | |
|---|---|---|---|
| 4,532,144 A * | 7/1985 | Vernet ...................... | C11B 1/12 426/643 |
| 4,551,305 A | 11/1985 | Nelson | |
| 2009/0061067 A1 * | 3/2009 | Tilseth .................... | A23L 33/17 426/602 |

FOREIGN PATENT DOCUMENTS

| | | |
|---|---|---|
| AR | 103021 | 4/2017 |
| GB | 537403 | 6/1941 |
| WO | 2004045317 | 6/2004 |

OTHER PUBLICATIONS

Grzonka, Z. et al. J. Polaina and A. P. MacCabe (eds.), Industrial Enzymes, pp. 181-195 (2007), Chapter 11, Cysteine Proteases (Year: 2007).*

* cited by examiner

*Primary Examiner* — Hamid R Badr
(74) *Attorney, Agent, or Firm* — Duane Morris LLP; Gregory M. Lefkowitz; Emily R Tannenbaum

(57) ABSTRACT

A biotechnological composition, more specifically, a composition and its specific application at a Stick water Evaporation Plant during the fish meal & oil manufacturing process, aimed to avoid increase of nitrogen volatile compounds and to reduce the viscosity of stick water concentrate is disclosed.

16 Claims, 1 Drawing Sheet

BIOTECHNOLOGICAL COMPOSITION AND ITS APPLICATION AT A STICK WATER EVAPORATION PLANT DURING THE FISH MEAL AND OIL MANUFACTURING PROCESS, AIMED TO AVOID INCREASE OF NITROGEN VOLATILE COMPOUNDS AND TO REDUCE THE VISCOSITY OF STICK WATER CONCENTRATE

SCOPE OF THE INVENTION

This invention deals with a biotechnological composition, more specifically, a set comprising a compound and its specific application at a stick water evaporation plant when producing fish meal & oil, aimed to avoid increase of nitrogen volatile compounds and to reduce the viscosity of stick water concentrate.

INVENTION BACKGROUND

In the State of the Art it is well known that fish meal & oil production involves cooking stages for the raw material, pressing, centrifugation, evaporation and drying, among others. These stages require to subject raw material to sudden temperature & pressure changes which can affect the quality of the flour produced, apart from the initial conditions of the raw material. One of the variables which can be impacted during the production of fish meal & oil is the amount of nitrogen volatile compounds (TBVN), such as the trimethylamine oxide, dimethylamine, monomethylamine and ammonia. The value of TBVN is critical when describing the quality of a certain batch of fish meal & oil, where differences in this value directly impact on the acceptance of the product in the market. That is the reason why controlling nitrogen volatile compounds during production of fish meal & oil is a critical variable and a challenge to be currently solved.

In the State of the Art some solutions are known aimed to reduce nitrogen volatile compounds, but no positive results have been obtained as what is intended with this invention. For instance, U.S. Pat. No. 4,551,305 describes a formula aimed to reduce amine and ammonia odors coming from organic waste, i.e. nitrogenous compounds. More specifically, it makes reference to fishing industry waste. Claim #1 deals with a formula aimed to reduce the amine and ammonia odors, which comprises: (a) spent sulfite liquor containing highly non degraded lignosulphonates and sugars; (b) 1.0 to 15.0% of the weight in acetic acid, based on the solids content coming from the spent sulfite liquor; (c) 0.5 to 10.0 grams of phenolic carbonyl compound per liter of such reducing formula; and (d) an alkaline substance modifying the pH in an amount high enough as to change the pH to a value between 6.5 to 8.0.

The Patent application WO 2004/045317, describes a preservative agent used for storing fish, fishing products and fishing byproducts, such as fish oil and fish meal during a long period. It also mentions that one of the goals includes reducing the concentration of total volatile nitrogens. The agent comprises an aqueous solution of carboxylic acids mixed with their salts, where such solution comprises between 20% to 80% of weight in carboxylic acids; between 0.01 to 2% of weight in an antioxidant; and between 0.01 to 2% of weight in a corrosion inhibitor.

The Patent application AR103021 describes a composition used to prevent melanosis in crustaceans which allows a proper conservation thereof. It comprises—between 0.3 to 2.0% of Ethylenediaminetetraacetic acid (EDTA); between 20 to 30% of citric acid anhydrous, between 20 to 25% of lactic acid, at 85%; between 12 to 18% of sodium hydroxide, at 99%; between 7 to 15% of sacarose, and 100% qs water.

On the other hand, the Patent application GB 537,403 describes a process aimed to refine oils fatty acids containing vitamins obtained from fish, where the process comprises treating the oil with activated carbon. It also comprises removing a portion of the free fatty acids (FFAs) by means of an alkaline treatment. The alkaline agents can be selected from potassium hydroxide (KOH), sodium hydroxide (NaOH) or sodium carbonate (Na2CO3).

However, none of the existing documents of the Prior Art describes a biotechnological composition aimed to avoid increase of nitrogen volatile compounds and at the same time, to reduce the viscosity of stick water concentrate during fish meal & oil production. They do not mention the point of application at a Stick water Evaporation Plant during fish meal & oil manufacturing process, which is part of this presentation by means of using specific enzymes. As here in before described, this invention aims to provide a solution by means of a mix between a biotechnological composition and its specific application at a Stick water Evaporation Plant, aimed to avoid increase of nitrogen volatile compounds and to reduce the viscosity of stick water concentrate, during fish meal & oil production. Another objective is to specifically determine the exact point application. Both are aimed to obtain the herein described results. Besides, this invention provides various advantages which have not been previously described in the State of the Art, among them we can mention the following:

- The percentage of nitrogen volatile compounds is reduced in 30% when applying the biotechnological composition of this invention;
- Due to the reduction of nitrogen volatile compounds, decomposition of the fish meal & oil are avoided;
- The viscosity decreases 70% when applying the biotechnological composition of this invention;
- As here in before described, the low viscosity facilitates evaporation, the heat transmission and agitation, thus generating lower energy consumption.
- Finally, the protein quality of the final product is not impacted, because thermal damage of the proteins is lower, which is noticeable in a higher color, due to a shorter concentration time, and lower operation temperatures when producing fish meal & oil.

SUMMARY OF THE INVENTION

This invention describes a biotechnological composition, more specifically the invention is related to an arrangement between a composition and its specific application at a Stick water Evaporation Plant during fish meal & oil manufacturing process, aimed to avoid increase of nitrogen volatile compounds and to reduce the viscosity of stick water concentrate. Such biotechnological composition, comprises:
- Between 100,000 a 150,000 U/g of one enzyme;
- Between 32 to 35% v/w of a first acetate salt, and between 3 to 5% v/w of a second carbonate salt;
- Between 10 to 12% v/w of an organic acid;
- Between 10-12% v/w of a first inorganic strong base, and between 5 to 8% v/w of a second inorganic strong base; and
- 100% qs water
- Where such biotechnological composition has a pH between 10 to 14; and
- where such biotechnological composition has a density between 1.2 and 1.5 g/mL.

Additionally, a process aimed to avoid increase of nitrogen volatile compounds and to reduce the viscosity of stick water concentrate during fish meal & oil production is described, which comprises the following stages:

i. It provides a biotechnological composition during fish meal & oil production, according to Claim #1;
  ii. It adds between 0.1% to 0.4% v/v of the biotechnological composition at the Stick water Evaporation Plant;
  iii. It reduces the concentration of nitrogen volatile compounds and—at the same time—it reduces the viscosity of stick water concentrate.

Finally, the use of the biotechnological composition of this invention is described, which is aimed to avoid increase of nitrogen volatile compounds and to reduce the viscosity of stick water concentrate during fish meal & oil production.

COMPREHENSIVE DESCRIPTION OF THIS INVENTION

Figure 1:
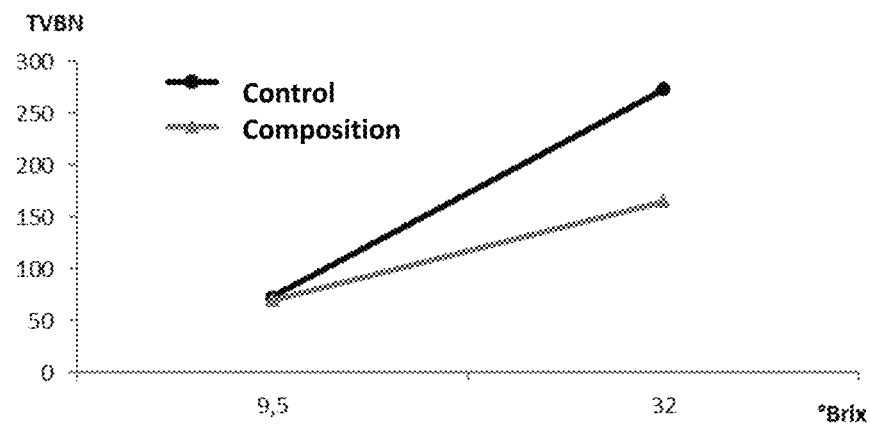
FIG. 1 displays the variation curve of nitrogen volatile compounds (TBVN), measured in a scale of mgN/100 g. Samples were taken at 9.5° Brix and a 32° Brix. These samples were not treated. Other samples were treated with the biotechnological composition of this invention.

This invention is related with a biotechnological composition aimed to avoid increase of nitrogen volatile compounds and to reduce the viscosity of stick water concentrate during fish meal & oil production; application of such biotechnological composition at a Stick water Evaporation Plant in the fish meal & oil manufacturing process. In a modality of this invention, such biotechnological composition has a pH between 10 to 14 and a density between 1.2 and 15 g/mL, where its components are selected among the following reagents:

Between 100.000 a 150.000 U/g of one enzyme;
  Between 32 to 35% v/w of a first acetate salt, and between 3-5% v/w of a second carbonate salt;
  Between 10 to 12% v/w of an organic acid;
  Between 10 to 12% v/w of a first inorganic strong base, and between 5 to 8% v/w of a second inorganic strong base; and
  100% qs water In a modality of this invention, the enzyme has a fungal origin, selected from the Filo Ascomycota, selected from Eurotiomycetes, of the Order Eurotiales, more specifically the Family Trichocomaceae. With no further aim to limit the scope of this invention, such enzyme may be selected from microscope fungi of the Gender *Aspergillus*, particularly from the species *Aspergillus* spp. Such enzyme is a food grade protease, obtained from the controlled fermentation, from a strain of *Aspergillus* spp., which effectively hydrolyzes non soluble proteins. In addition, the enzyme has extremophilic properties, allowing it to withstand varying concentrations of pH, both strong acid solutions and strong basic solutions. Such enzyme may be one native/recombinant enzyme, obtained from a none purified extract or from one purified enzyme. As this enzymatic system has both endopeptidase and exopeptidase, it allows to release polypeptides and amino acids, thus increasing the soluble protein, and it allows to have a more effective evaporation process and a more hydrolyzed concentrate improving flour quality, thus allowing to get flour with a lower TBVN content and a better homogenization thereof.

In a modality of this invention, the first acetate salt is selected among sodium acetate, potassium acetate, calcium acetate, magnesium acetate, manganese acetate, or combinations thereof. The second carbonate salt is selected among sodium carbonate, potassium carbonate, calcium carbonate, magnesium carbonate, manganese carbonate, or combinations thereof. The first acetate salt has a concentration between 32 to 35% v/w. The second carbonate salt has a concentration between 3 to 5% v/w.

In a modality of this invention, the biotechnological composition comprises between 10 to 12% v/w of an organic acid, which is selected among acetic acid, adipic acid, ascorbic acid, citric acid, lactic acid, phosphoric acid, fumaric acid, malic acid, sorbic acid and/or tartaric acid, preferably acetic acid.

In a modality of this invention, the biotechnological composition comprises a first inorganic strong base selected between potassium hydroxide and sodium hydroxide, preferably potassium hydroxide. The second inorganic strong base is selected between sodium hydroxide and potassium hydroxide, preferably sodium hydroxide. The first inorganic strong base comprises a concentration between 10 to 12% v/w. The second inorganic strong base comprises a concentration between 5 to 8% v/w.

The biotechnological composition is preferably liquid and is added at the Stick water Evaporation Plant during the production of fish meal & oil. The studied dosage is at 0.1% v/v and at 0.4% v/v which allows to reduce the concentration of basic volatile nitrogens (TBVN) from 30%. The viscosity of the stick water concentrate is reduced as well, thus obtaining values between 200 to 300 cp against 3000-5000 cp of the none treated product. The low viscosity facilitates evaporation, heat transmission and agitation, which generates lower energy consumption.

Additionally, the application of this biotechnological composition at the Stick water Evaporation Plant during fish meal & oil production is described, and aimed to avoid increase of nitrogen volatile compounds and reducing the viscosity of stick water concentrate, which comprises the following stages:

i. To provide a biotechnological composition during fish meal & oil production, according to Claim #1;
  ii. To add, between 0.1% to 0.4% v/v of the biotechnological composition at the Stick water Evaporation Plant;
  iii. To reduce the concentration of nitrogen volatile compounds and—at the same time—to reduce the viscosity of stick water concentrate.

Finally, use of biotechnological composition of this invention is described, which is aimed to avoid increase of nitrogen volatile compounds and to reduce the viscosity of stick water concentrate during fish meal & oil production.

EXAMPLES

Example #1: Assessment Protocol

1. Samples of 500 mL of stick water coming from fish meal & oil production processes were taken.
2. The samples were put into five beakers, with 100 ml of stick water each.

3. Various concentrations of the biotechnological composition of this invention were added to the samples obtained from the stick water. Control samples were tested with no treatment.

4. Initial concentration of nitrogen volatile compounds, solids % and viscosity were measured.

5. The samples were boiled between 25 to 30 minutes.

6. At 60° C. the samples were concentrated 4 times by means of vacuum evaporation.

7. Finally, concentration of nitrogen volatile compounds, solids % and viscosity were measured.

For calculating nitrogen volatile compounds, the following formulas were used:

$$\Delta TBVN_{control} = (TBVN_{final} - TBVN_{initial})$$

$$\Delta TBVN_{treatment} = (TBVN_{final} - TBVN_{initial})$$

$$\% = \left\{1\left[\frac{\Delta TBVN_{Treatment}}{\Delta TBVN_{control}}\right]\right\}100$$

Example 2: Reduction of Nitrogen Volatile Compounds

The tests were designed to prove reduction of TBVN which is obtained by applying the biotechnological composition of this invention. In order to do so, the initial TBVN concentration—for each portion of the product of interest—was analyzed in a 100 mL stick water sample. The samples were concentrated 4 times by means of vacuum evaporation, at 60° C. After this, a dosage of 0.1% v/v of the biotechnological composition of this invention was added. The Table #1 displays lab results.

TABLE #1

Values of nitrogen volatile compounds in the stick water

| Treatment | TBVN (mgN/100 g) Initial | TBVN (mgN/100 g) Final | Degrees ° Brix Initial | Degrees ° Brix Final |
|---|---|---|---|---|
| Blank | 73.15 | 273.35 | 9.5 | 32 |
| Composition (0.1% v/v) | 69.65 | 165.20 | 9.5 | 32 |

These results proved that biotechnological composition of this invention reduced the concentration of nitrogen volatile compounds, during the stick water concentration process when comparing such values with a blank sample with no product that resembles normal increase in the evaporators when TBVN is not controlled. These results show that the percentage of nitrogen volatile compounds dropped 30% when applying the biotechnological composition of this invention, against treatment control, thus proving high its effectiveness.

Example 3: Reduction of Stick Water Concentrate Viscosity

Figure 2:
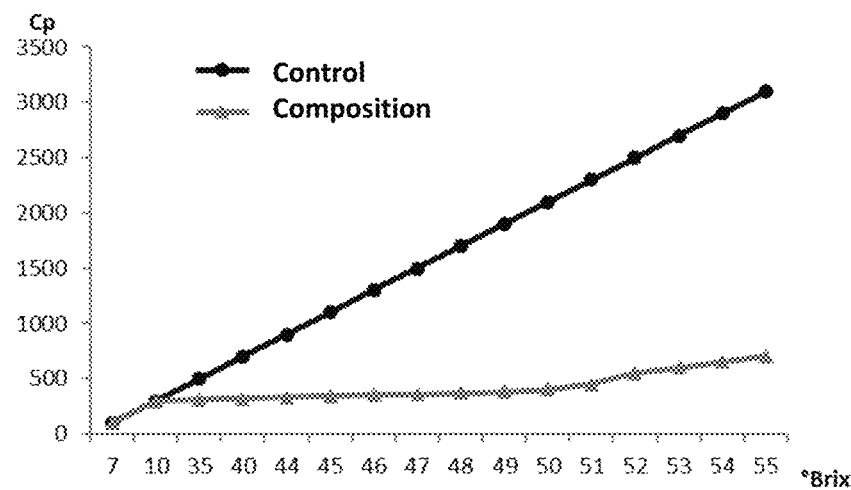
FIG. 2 displays the viscosity of stick water concentrate, measured with the Centipoise Scale (cP). Samples were taken at 9.5° Brix and at 32° Brix. These samples were tested with no treatment. Other samples were treated with the biotechnological composition used for this invention.

Tests were designed to prove that viscosity drop is obtained by applying the biotechnological composition of this invention. In order to do so, the initial viscosity was analyzed in one sample of 100 mL containing stick water for each portion of the tested product. The samples were concentrated 4 times by means of vacuum evaporation, at 60° C. After this, a dosage of 0.1% v/v of the biotechnological composition of this invention was added. FIG. 2, shows the results—The viscosity of stick water concentrate was reduced, obtaining values between 200 to 300 cp against 3000 to 3500 cp from the none treated product. The low viscosity facilitates evaporation, heat transmission and agitation, thus causing lower energy consumption. These results prove that viscosity was reduced 70% when applying the biotechnological composition of this invention, against treatment control, thus proving its high effectiveness.

While this invention has been described under the foregoing modalities, it would be apparent that other alternatives, modifications or variations would provide the same results. Consequently, the modalities of this invention mean to be self-explanatory, but not constricting. Several changes can be made without leaving the spirit and scope of this invention, just as defined in the following Claims. All patents, patents application, scientific articles and other public documents that—according to the Applicant—represent the State of the Art, have been properly quoted in this application.

The invention claimed is:

1. A biotechnological composition to avoid increase of nitrogen volatile compounds and to reduce the viscosity of stick water concentrate during fish meal & oil production, wherein comprises:

Between 100,000 to 150,000 U/g of one enzyme;

Between 32 to 35% w/v of a first acetate salt, and between 3 to 5% w/v of a second carbonate salt;

Between 10 to 12% w/v of an organic acid;

Between 10 to 12% w/v of a first inorganic strong base, and between 5 to 8% w/v of a second inorganic strong base; and 100% qs water where the composition has a pH between 10 to 14; and where the composition has a density between 1.2 to 1.5 g/mL.

2. The composition, according to the claim 1, wherein the enzyme is selected from Filo Ascomycota.

3. The composition, according to claim 1, wherein the enzyme is selected from Class Eurotiomycetes.

4. The composition, according to claim 1, wherein the enzyme is selected from Order Eurotiales.

5. The composition, according to claim 1, wherein the enzyme is selected from the Family Trichocomaceae.

6. The composition, according to claim 1, wherein the enzyme is selected from genus *Aspergillus*.

7. The composition, according to claim 1, wherein the enzyme is a protease.

8. The composition, according to claim 1, wherein the enzyme is a protease from *Aspergillus* spp.

9. The composition, according to claim 1, wherein the enzyme is a native enzyme or recombinant enzyme.

10. The composition, according to claim 1, wherein the enzyme may be a none purified extract or a purified enzyme.

11. The composition, according to claim 1, wherein the first acetate salt is selected from the group consisting of sodium acetate, potassium acetate, calcium acetate, magnesium acetate, manganese acetate, and combinations thereof.

12. The composition, according to claim 1, wherein the second carbonate salt is selected from the group consisting of sodium carbonate, potassium carbonate, calcium carbonate, magnesium carbonate, manganese carbonate, and combinations thereof.

13. The composition, according to claim 1, wherein the organic acid is selected from the group consisting of acetic acid, adipic acid, ascorbic acid, citric acid, lactic acid, phosphoric acid, fumaric acid, malic acid sorbic acid and/or tartaric acid.

14. The composition, according to claim 1, wherein the first inorganic strong base is selected from the group consisting of potassium hydroxide and sodium hydroxide.

15. The composition, according to claim 1, wherein the second inorganic strong base is selected from the group consisting of sodium hydroxide and potassium hydroxide.

16. A process to avoid increase of nitrogen volatile compounds and to reduce the viscosity of stick water concentrate during fish meal & oil production, wherein it comprises the following stages:
  i. providing a biotechnological composition—during fish meal & oil production—according to claim 1;
  ii. adding between 0.1% to 0.4% v/v of the biotechnological composition, at the Stick water Evaporation Plant;
  iii. reducing the concentration of nitrogen volatile compounds and—at the same time—to reduce the viscosity of stick water concentrate.

* * * * *